United States Patent [19]

Gregorian et al.

[11] 3,860,469
[45] Jan. 14, 1975

[54] METHOD OF MAKING A LEATHER-LIKE TEXTURIZED LAMINATE

[75] Inventors: Razmic S. Gregorian, Aiken, S.C.; Hans R. Hoernle, Augusta, Ga.

[73] Assignee: United Merchants and Manufacturers, Inc., New York, N.Y.

[22] Filed: Apr. 18, 1974

[21] Appl. No.: 460,407

Related U.S. Application Data

[63] Continuation of Ser. No. 217,844, Jan. 14, 1972, abandoned.

[52] U.S. Cl. ................... 156/83, 156/85, 156/153, 161/53, 161/64, 161/109, 161/DIG. 2
[51] Int. Cl. ... B32b 27/24, B32b 7/08, B32b 31/22, B32b 3/10, B29c 27/00
[58] Field of Search ................ 161/53, 62, 64, 109, 161/DIG. 2, DIG. 3; 156/83–85, 153

[56] References Cited
UNITED STATES PATENTS

| | | | |
|---|---|---|---|
| 3,180,775 | 4/1965 | Sexsmith | 156/85 |
| 3,214,323 | 10/1965 | Russell et al. | 156/85 X |
| 3,228,745 | 1/1966 | Galatioto | 156/85 X |
| 3,616,126 | 10/1971 | Tungseth | 161/53 |
| 3,622,434 | 11/1971 | Newman | 156/85 X |

*Primary Examiner*—Philip Dier
*Attorney, Agent, or Firm*—Jules E. Goldberg; John P. McCann

[57] ABSTRACT

A laminate comprising a non-woven or woven fabric backing layer having fibers upstanding therefrom and a film-like facing layer secured to the tips of the upstanding fibers. The facing layer and backing layer are spaced apart from one another and are movable in a plane with respect to each other. The ratio of the unit area of the facing layer to the unit area of the backing layer is greater than that same ratio prior to securement of the layers to one another, producing high and low portions in the facing layer which appear as ripples, puckers or wrinkles.

A process for preparing the laminate by first securing the layers to one another and then either shrinking the backing layer or expanding the facing layer.

9 Claims, 7 Drawing Figures

PATENTED JAN 14 1975    3,860,469

METHOD OF MAKING A LEATHER-LIKE TEXTURIZED LAMINATE

CROSS REFERENCE TO RELATED APPLICATIONS

This application is a continuation of copending application Ser. No. 217,844, filed on Jan. 14, 1972.

BACKGROUND OF THE INVENTION

1. Field of the Invention

This invention is related to the field of texturization. More particularly, this invention pertains to leather-like laminates possessing unusual texturization effects.

2. Description of the Prior Art

Leather-like laminated sheet materials comprising a skin layer and a napped backing layer are known.

Generally such leather-like laminated materials are composed of a top layer of a thermo-setting plastic and a bottom layer of a woven or non-woven fabric having upstanding fibers such as in the form of a nap or loops. The thermo-setting plastic is in the form of a film deposited on and secured to the tops of uppermost portions of the raised fibers or loops.

In order to impart leather-like wrinkles, ripples, puckers, etc., into such laminates, it has been necessary in the past to thermally treat the laminate as by embossing, coating, printing or rotogravure printing. Additionally, where the laminate is prepared by casting a film upon a release paper and then applying the backing layer thereto, it is known to use a release paper having surface modifications. Thus, if the release surface has slight indentations or differences in the relief pattern thereof, the film, after being set, will depict such modifications.

However, all of these methods for creating texturization effects in this type laminate require relatively expensive equipment or materials and substantial plant processing time. Consequently, such laminated fabrics, particularly those having highly styled effects are relatively expensive.

SUMMARY OF THE INVENTION

We have discovered a new leather-like laminated fabric which exhibits texturized effects in the form of ripples, wrinkles and puckers, which laminate is produced by a method much simpler than those which have been known heretofore. More particularly, the laminate of the present invention comprises a backing layer of fabric having a multiplicity of upstanding fibers which project substantially uniformly from all parts of one surface of the fabric and a flexible film-like facing layer secured to the tips of the upstanding fibers. The facing layer and the backing layer are spaced apart from one another by virtue of the upstanding fibers and are movable in a plane with respect to each other. The ratio of the unit area of the facing layer to the unit area of the backing layer is greater than that same ratio prior to the securement of the layers to one another. By virtue of the difference in ratio, the facing layer or skin of the laminate has raised portions and unraised portions which when viewed overall appear as a wrinkled, puckered, or rippled effects in the facing layer.

We have further discovered a highly breathable, texturized laminate as described hereinabove wherein the raised portions of the wrinkles, ripples, etc. have therein a multiplicity of minute perforations.

We have found that the laminate of the present invention may be prepared by first securing the facing layer in the form of a film to the tips of uppermost portions of the raised fibers and then subjecting the thus secured laminate to either a shrinking process wherein the backing material is shrunken or an expansion process wherein the facing layer is expanded.

Additionally, we have found that after the shrinking or expansion step, the breathability of the laminate may be substantially increased by lightly sanding the facing layer whereby to produce minute pores or perforations in the raised portions of the facing layer.

DESCRIPTION OF THE PREFERRED EMBODIMENTS

Figure 1:
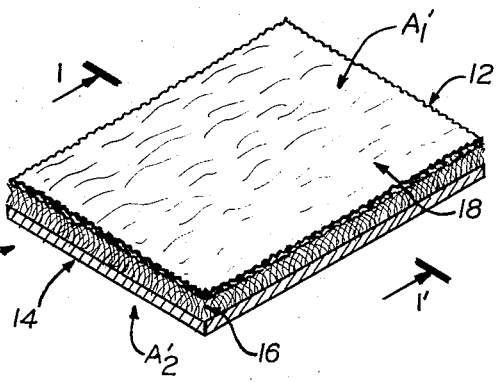
FIG. 1 is a view, in perspective, of the present invention.
Figure 4:
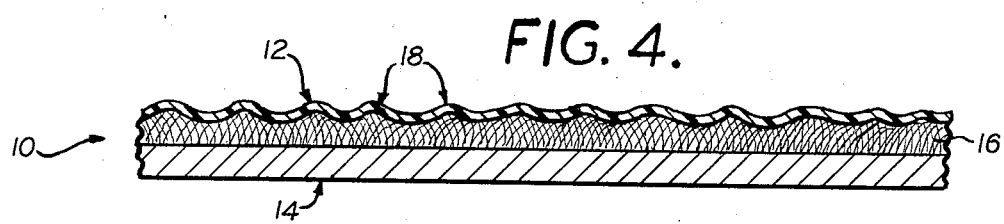
FIG. 4 is a view along the line 1—1' of FIG. 1.

Referring to the drawings and, in particular, FIGS. 1 and 4, the present invention comprises a laminate generally depicted as 10 comprising a skin-like facing layer 12, having ripples, puckers, or wrinkles therein, and a fabric backing layer 14 which has a multiplicity of upstanding fibers 16 projecting therefrom. Facing layer 12 is secured to the uppermost tips of fibers 16. Fibers 16 are distributed substantially uniformly over the surface of backing layer 14.

The various wrinkles, puckers, or ripples depicted generally at 18 arise by virtue of the difference in ratio of the unit areas of the facing layer 12 to the backing layer 14 as compared with that same ratio for the laminate prior to adherence of the facing layer to the backing layer.

Figure 2:
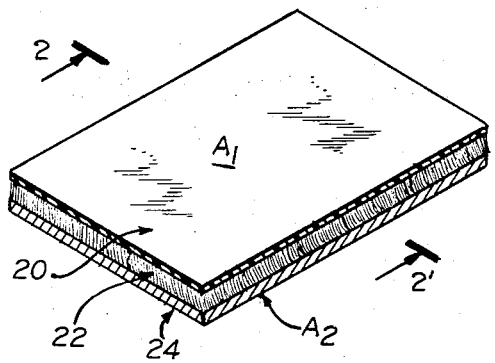
FIG. 2 is a view, in perspective, of a laminate prior to conversion to the present invention.
Figure 5:
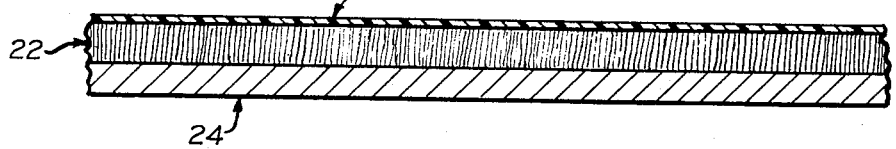
FIG. 5 is a view along the line 2—2' of FIG. 2.

FIGS. 2 and 5 depict a laminate just prior to securement of the facing layer 20 to the tips of the fibers 22 which are attached to backing layer 24. The area of facing layer 20 is designated $A_1$, and the area of backing layer 24 is designated $A_2$. As used herein, the term "unit area" is the area of a given unit of the layer involved. The unit may be of any convenient size, e.g., 1 square inch, 1 square centimeter, etc. While it is not necessary that the unit areas initially chosen for the facing and backing layers be the same, it is convenient that they be chosen such that the ratio $A_1:A_2$ is 1.

As shown in FIG. 1, $A_1'$ represents the unit area for the facing layer and $A_2'$ represents the unit area for the backing layer. That is to say, that $A_1'$ represents the unit areas $A_1$ and $A_2$, respectively, after the two layers have been incorporated into the laminate of the present invention.

Thus, the laminate of the present invention as depicted in FIG. 1 is further defined by the characteristic that the ratio $A_1'/A_2'$ is greater than the ratio $A_1/A_2$. Preferably, the ratio $A_1'/A_2'$ is between about 20 to 50 percent greater than the ratio $A_1/A_2$.

This characteristic is a result of the fact that in accordance with the process as hereinafter described, after securement of the layers to one another, the relative size of the unit areas change. As a result of this change, the desired wrinkle, puckered, etc. effects are obtained. In all cases, however, this effect is obtained by decreasing the unit area of the backing layer relative to the unit area of the facing layer. Thus, for example, and purely for illustrative purposes, let us assume that 10 square inches of facing layer were initially secured to 10 square inches of backing layer. The securement is such that the layers are directly in line with one another. At this point, the ratio of the unit area of the facing layer to the unit area of the backing layer is 1.0. After treatment in accordance with the present process, the unit area of the facing layer has changed relative to the unit area of the backing layer such that the ratio of the unit areas is now greater than 1. This may be accomplished either by expanding the facing layer or shrinking the backing layer. Thus, for example, in the case of expansion of the facing layer, it may be that the area of the facing layer that previously was 10 square inches may now be 10.5 square inches. The unit area of the backing layer, however, has not changed and remains 10 square inches. Consequently, the ratio of the unit areas is greater than 1.

Alternately, it is possible to maintain the unit area of the facing layer substantially constant and shrink the backing layer. Thus, the unit area of the facing layer would be 10 square inches and perhaps the unit area of the backing layer would be 9.5 square inches. Again, the ratio of the areas is greater than 1.

Thus, by virtue of the differential change in unit areas of the facing layer and backing layers, and the requirement that this ratio always change in a given direction, i.e., it must increase, the flexible facing layer undergoes a wrinkling effect.

Referring again to FIG. 1, the facing layer 12 of the present invention may be formed from a variety of flexible film forming materials. Thus, for example, materials such as urethanes, vinyls, acrylics, polyamides, polyesters, polyethylenes, polypropylenes, silicones, and the like may be used. For the most part, it has been common in the art to use either a polyurethane or a polyvinyl material for the facing layer. In any event, the exact material used for the facing layer is not critical so long as it is a type having flexible film forming properties. Thus, for example, it is also possible to use a rubber type material.

The film forming material may also contain additives well known in the art such as pigments, anti-oxidants, fillers, dyes, etc.

Fabric backing 14 may be a woven, non-woven or knitted fabric of a variety of textile fibers, including synthetics, natural fibers, and combinations thereof. Preferred are cotton, rayon, nylon, polyester, acrylics, vinyls, wool, silk, mohair, acetate, and combinations thereof. The particularly textile fiber used is not critical to the invention and may be selected depending on the final properties desired for the laminate.

Upstanding fibers 16 may be in the form of individual fibers, i.e., a nap, flock, or loops. Methods for obtaining napped flocked, and looped fabrics of this type are well known. Normally, the upstanding fibers are substantially uniformly distributed about the surface of the fabric. The height of the fibers may vary widely, but generally is within the range from about 0.015–0.035 inch.

Facing layer 12 is secured to the upper most or tipped portions of upstanding fibers 16. This may be accomplished in several ways well known to the art. For example, it is possible when initially fabricating the laminate to simply imbed the tips of the fibers in the skin or facing layer while the facing layer is in a thermo-plastic or uncured state. Alternately, the facing layer 12 may be secured to the upper portions of raised fibers 16 by means of a separate adhesive layer. Generally, such an adhesive layer is extremely thin, e.g., about 0.0015 to 0.0020 inches. The adhesive should be of a material which is chemically similar or compatible with the material comprising the facing layer. So long as a compatible material is used and the adhesive layer is sufficiently thin, the type of securement used does not critically alter the characteristics of the present invention.

The laminate of the present invention as described hereinabove may be produced by first securing a backing layer in accordance with the foregoing description to a facing layer, as described hereinabove.

The facing layer may be performed or may be formed by application directly to the raised fibers. Methods for fabricating such laminates are well known. Thus, for example, the most popular method is to cast a film of the material comprising the facing layer upon a temporary backing surface such as a coated release paper which has minimum affinity for the material. After casting, but before the film is hardened or set, the backing layer, nap side down, is then applied to the facing layer in such a manner that only the tips of the fibers are embedded in the facing layer.

As noted hereinabove, it is also possible to coat the facing layer with an adhesive substance which will provide the securement of the fibers to the facing layer. In either case, the thus formed laminate is subjected to a curing or setting treatment which will set the fibers into either the facing layer or the adhesive, which ever is used. Thereafter, the entire laminate is removed, as by peeling, from the release surface.

In accordance with the process of the present invention, the ratio of the unit area of the facing layer to the unit area of the backing layer is increased by either shrinking the backing layer or expanding the facing layer. Methods for accomplishing either of these processes are well known to the art. Thus, for example, shrinking of the backing component may be accomplished either by chemical shrinkage whereby a chemical shrinking agent is applied to the backing component or by a physical shrinkage method, i.e., moisture and heat.

Insofar as chemical shrinkage methods are concerned, the shrinkage agent may be applied to the backing component in a number of methods such as printing, spraying, dipping and the like. All such methods are conventional. Printing of a shrinking agent onto the backing may be carried out by incorporating the shrinkage agent in a paste composition and then applying the paste to the backing as with a knife, roller-coater, and the like.

Many types of well known chemical shrinking agents may be used depending on the nature of the fibers comprising the backing component. Thus, it is understood that the shrinking agent should be a material which will not chemically attack the facing layer or any adhesive which might have been used to secure the facing layer to the backing layer or the fibers to the backing layer (as in the case of a flocked fabric). Moreover, in all cases, the residue of a shrinking agent should be readily removable in a backwashing step, such as, for example, a mildly alkaline backwash which would be used to remove acidic agents from a backing layer made of nylon.

Additionally, shrinking agents should be avoided which would readily diffuse through the facing layer or any adhesive layer present or cause a weakening of the securement of the facing layer to the backing layer.

When the backing layer to be shrunken is nylon, the shrinkage agent should be an acidic material having a dissociation constant greater than about $2 \times 10^{-5}$. Suitable acidic materials include strong mono and polybasic inorganic acids and organic acids having the formula R-COOH wherein R is hydrogen, lower alkyl having 1 to 5 carbon atoms, lower alkenyl having 1–5 carbon atoms, or halogen substituted lower alkyl. Particularly suitable acids include acrylic acid, formic acid, monochloroacetic acid, dichloroacetic acid, alpha-chloropropionic acid, bromoacetic acid, trifluoroacetic acid, o-chlorobenzoic acid, 3,5-dinitrobenzoic acid, sulfonic acids, such as, p-toluenesulfonic acid, benzenesulfonic acid, and phenols, such as, p-toluenesulfonic acid, benzenesulfonic acid, and phenols, such as, m-cresol, and p-chlorophenol.

The mineral acids, such as, hydrochloric and sulfuric acids are also suitable providing they are utilized in a sufficiently diluted form to minimize fiber degradation.

When the backing layer to be shrunken is a polyacrylic material, the shrinking agent may be an acid such as defined hereinabove as being suitable for nylon; a salt formed from cations selected from the group consisting of $Zn^{++}$, $Ag^+$, $Ni^{++}$, $Co^{++}$, $Mn^{++}$, and an anion selected from the group consisting of $SCN^-$, $I^-$, $Br^-$, and $Cl^-$; disubstituted amides having the formula

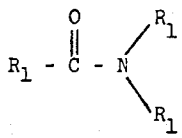

wherein $R_1$ is hydrogen or lower alkyl having from 1 to 5 carbon atoms, or lower alkyl carbonates, the alkyl portions of which contain 1 to 5 carbon atoms.

Particularly suitable shrinking agents for polyacrylics include alpha-chloroacetic acid, trifluoroacetic acid, hydrochloric acid, nitric acid, sulfuric acid, zinc iodide, silver idodide, ethylene carbonate, propylene carbonate and dimethyl acetamide.

When the backing layer to be shrunken is a cellulosic derived material, the shrinking agent should be a basic material. Suitable shrinking agents for cellulosics include inorganic bases such as sodium hydroxide, potassium hydroxide, barium hydroxide, ammonia, strong organic bases having a dissociation constant greater than about $2 \times 10^{-5}$, such as benzyltrimethylammonium hydroxide and tetraethylammonium hydroxide, and organic amines such as, ethylamine, triethyl amine, diisopropryl amine, dibutyl amine, ethylene diamine, triethylene tetramine, and the like.

When the shrinking agent is applied in the form of a paste, the concentration and viscosity of the shrinking agent will vary depending on the amount of shrinkage and effects desired. Although generally the shrinking agent is in an aqueous solution or mixture, it is possible depending on the laminate used and the shrinking agent to use other solvents.

The viscosity of the mixture or paste is usually varied by adding a thickening agent in a manner well known in the art. The preparation of such pastes are well known to the art and, of course, the rheology of the paste will depend on the thickening agent used.

After the application of the shrinking agent to the component, the laminate is dried. The conditions of drying will depend not only on the reactivity and the concentration of the shrinking agent, but also on the nature of the heating mechanism and the type laminate being shrunk. Thus for example, when conventional laboratory ovens are used to affect shrinkage of cellulosics, the sodium hydroxide shrinking agent concentration is preferably in the range from about 30 to 50 percent and the heating is preferably carried out at a temperature in the range from about 80° to 125°C. When high pressure, steam-heated, can dryers of the conventional type normally found in textile mills are used, the preferred concentration range for sodium hydroxide when treating a cellulosic material is from about 10 to 25 percent.

When a volatile shrinking agent is used, it is generally preferable to heat the material with the shrinking agent thereon in an autoclave. Of course, if a more reactive shrinking agent is used, the drying may be carried out at a lower temperature. Thus, for example, with very reactive shrinking agents, it is possible to dry at room temperature.

Consequently, the drying operation can be carried out in a temperature range from about ambient to a temperature limited only by the degradation temperature of the components of the laminate. Usually, the preferably operating temperature would be in the range from about 80° to 160°C.

After the drying step, the fabric is washed to remove any remaining or residual shrinking agent. The components and pH of the backwash, will, of course, depend on the nature of the shrinking agent. Usually it is most desirable for economic reasons that the back washing solution be aqueous.

When the shrinking agent is an acid having a dissociation constant greater than about $2 \times 10^{-5}$, an aqueous wash solution containing a relatively weak base such as for example, sodium carbonate, trisodium phosphate, or ammonia can be used. When the shrinking agent is a weak acid such as phenol, a more alkaline washing solution may be required.

If the shrinking agent is an alkaline material having a dissociation constant greater than about $2 \times 10^{-5}$, an aqueous solution containing any inorganic acid with a dissociation constant greater than about $1 \times 10^{-5}$ can be used. It is understood, of course, that the washing solution must not contain any materials which will either degrade the materials comprising the laminate or attack the adhesive interlayer.

It is also possible, when the shrinking agent is an organic solvent, to remove any residual shrinking agent by steaming or volatilization as by passing the laminate through ovens or over hot cans.

As noted hereinabove, physical methods, namely heating, may be used to shrink the backing layer. Thus, for example, depending on the type of textile fiber used in the backing layer, it is possible to shrink the backing layer merely by dipping in a hot dye bath or aqueous bath and then drying the laminate at elevated temperature. In any event, such physical shrinkage methods are well known and conventional in the art.

In the case where rather than shrinking the backing component, it is desired to expand the facing layer, the facing layer is treated with a material, usually a solvent, which expands the facing layer in preference to the fabric layer. Generally, this may be accomplished by swelling agents although other means are known.

Thus, for example, when the facing layer is a urethane material, suitable solvents include alkyl halides having more than one halo group, e.g., chlorine, bromine or iodine, and having from 1 to 6 carbon atoms; and organic acids having a dissociation constant greater than $2 \times 10^{-5}$ and having the formula R—COOH wherein R is hydrogen, lower alkyl having 1 to 5 carbon atoms, halogen substituted lower alkyl, and lower alkenyl having 1 to 5 carbon atoms, in combination with the foregoing described alkyl halides cyclic ethers containing 5 to 8 carbon atoms in the heterocyclic ring thereof and ketones having the formula:

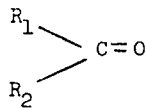

wherein $R_1$ and $R_2$ may be the same or different and are lower alkyl having from 1 to 5 carbon atoms.

Preferred expansion agents for urethanes are methylene chloride, bromoform, trichloroethylene, perchloroethylene, acrylic acid, formic acid, monochloroacetic acid, dichloroacetic acid, alphachloropropionic acid, bromoacetic acid, trifluoroacetic acid, o-chlorobenzoic acid, 3,5-dinitrobenzoic acid, or the foregoing acids being combined with the foregoing described alkyl polyhalides, or dioxane, tetrahydrofuran, furan, oxetane, methylethyl ketone, diethylketone, and the like.

For vinyl films, the preferred expansion agents are aromatic hydrocarbons, such as, toluene and xylene.

For polypropylenes, the preferred expansion agents are chlorinated hydrocarbons, such as, chlorobenzene, trichlorobenzene, p-chlorotoluene, at temperatures of about 50°–80°C.

For polyethylenes, the preferred expansion agents include aromatic hydrocarbons, such as, benzene, toluene, and xylene, preferably used at a temperature of about 40°–80°C.

For polyesters, the preferred expansion agents include chlorinated hydrocarbons such as tetrachloroethane and trichlorobenzene, phenols such as o-cresol, 2,4-dimethylphenol and p-cresol.

For polyacrylates, the preferred expansion agents include esters such as butyl acetate and benzyl acetate; ketones such as isophenone, and methylisobutyl ketone; aromatic hydrocarbons such as benzene, toluene, and xylene; and chlorinated hydrocarbons such as chlorobenzene, p-chlorotoluene, tetrachloroethane and trichlorobenzene.

For polyamides, the preferred expansion agents include 90 percent formic acid, o-cresol, and 2,4-dimethylphenol.

The expansion agents may be applied to the facing layer of the laminate either by dipping, spraying, or by exposing the laminate to the vapors thereof in the case of the lower boiling solvent-like compounds. Normally, the expansion agents do not lend themselves to a printing operation as in the case with the shrinkage agents. In any event, the method of application is not critical so long as the overall expansion is affected.

As is the case with those materials preferred for use as ahrinking agents for the backing layer, the preferred expansion agents for the facing layer are those whose residues can be readily removed in a back-washing step and which do not cause weakening of the securement of the backing layer to the facing layer.

The concentration, temperature, time, and other conditions of the expansion step vary depending on the components of the laminate, the expansion agent used, and the end result desired. The optimum conditions to produce a given result may be readily ascertained by the skilled art worker.

After the expansion is complete, the laminate is washed to remove any residual expansion agent and is then dried in a conventional manner.

Figure 3:
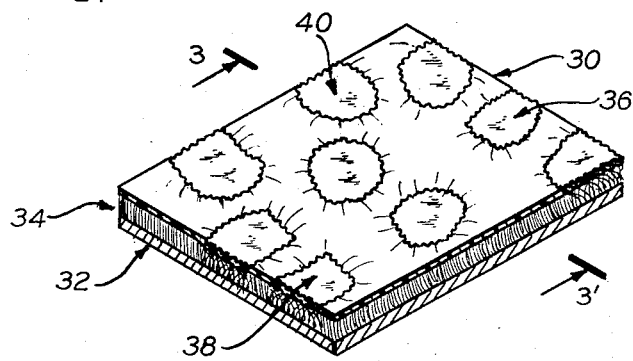
FIG. 3 is a view similar to that of FIG. 1 of another embodiment of the present invention.
Figure 6:
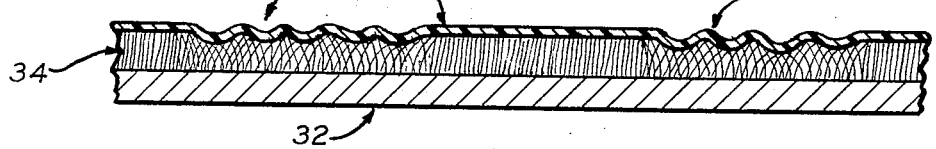
FIG. 6 is a view along the line 3—3' of FIG. 3.

In accordance with yet another embodiment of the present invention and referred particularly to FIGS. 3 and 6, a laminate is shown having a facing layer 30, a backing fabric layer 32 and upstanding fibers 34 projecting from backing layer 32, facing layer 30 being secured to the uppermost tips of fibers 34. Facing layer 30, fibers 34, and backing layer 32 are all in accordance with the description of these components hereinabove, with the exception that facing layer 30 has therein major areas of puckering as designated by numbers 36, 38 and 40. Overall, the same relationship exists between the ratio of the unit area of the facing layer to the unit area of the backing layer for the laminate as depicted in FIG. 3 as compared with the same ratio for the laminate prior to securement of the facing layer to the backing layer.

The laminate in accordance with that depicted in FIG. 3 is obtained by first securing a facing layer to a backing layer in a manner as hereinabove described and then printing the backing layer with a shrinkage agent in a predetermined pattern design. Such printing is of the type discussed hereinabove. It may be accomplished by printing a shrinkage agent generally in the form of a paste as described hereinabove onto the backing layer with silk and rotary silk screen processing, conventional color and dye printing machines, rollers, and the like. Thereafter, the shrinking agent is washed off and the laminate dried. Depending on the predetermined pattern design used, at those areas where the shrinking agent was applied to the backing component, extreme puckers will be produced in the facing component. These puckers will take on the general shape of the area over which the shrinkage agent was applied. Thus, for example, if the shrinkage agent was applied in a circular area, the pucker on the facing component will be circular in shape whereas if the area was a square, the pucker will take on a square shape. Additionally, between puckered areas on the facing layer, there will appear transverse ribs traveling from one area of puckering to another area.

Clearly, by varying the printing design, many unusual combinations and effects may be achieved.

The laminates of the present invention are particularly useful for those end uses where leather-like effects are desired such as upholstery, exterior garments, footwear, luggage, sporting goods items, and the like.

Figure 7:
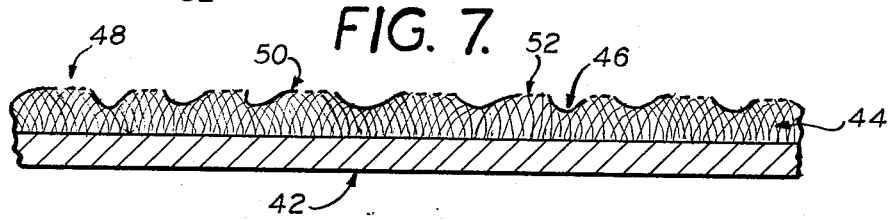
FIG. 7 is a view, in cross-section, of yet another embodiment of the present invention.

Referring to FIG. 7 another embodiment of the present invention is shown comprising backing layer 42, upstanding fibers 44 and facing layer 46. This laminate is produced in the same manner as described with regard to the laminates shown in FIGS. 1 and 3 with the additional step of subjecting the facing layer to a light sanding as with a fine sandpaper or emory paper.

As noted hereinabove, by virtue of the expansion of the facing layer or shrinkage of the backing layer as described hereinabove, the facing layer of the laminate develops raised and unraised portions which appear as ripples, wrinkles, etc. in the facing layer. By lightly sanding the facing layer, a multiplicity of small apertures or perforations designated as 48, 50 and 52 in FIG. 7 are produced in the raised portions of the ripples. The presence of these perforation facilitate the transfer of air and moisture through the laminate thereby rendering the laminate "breathable".

Any type abrasive surface may be used to affect the sanding operation. Understandably, the sanding must be relatively light so as not to produce undesirable damage or scratching on major areas of the facing layer.

The following examples illustrate the present invention:

EXAMPLE 1

A laminate having a nylon tricot layer and a urethane facing layer of the diisocyanate/polyethylene glycol type was immersed at ambient temperature in a solution of 75 percent acrylic acid and 25 percent water for 30 seconds. The laminate was rinsed in water of approximately 30°C until all of the acid was removed and was then dried at 100°C.

The resulting laminate exhibited a moderately textured urethane surface.

EXAMPLE 2

A laminate having a nylon tricot backing layer and a urethane facing layer of the diisocyanate/polyethylene glycol type was immersed for 30 seconds at ambient temperature in a solution consisting of 1 part acrylic acid and 1 part methylene chloride. The excess solvent was removed by padding. The laminate was dried at 125°C for 5 minutes.

The modified laminate exhibited a highly and densely puckered urethane surface resembling suede. Breathability was imparted by sanding the textured urethane layer with emory cloth of a fine grit. The sanding produced tiny pores in the urethane facing layer.

EXAMPLE 3

A laminate having the facing and backing layers as described in Example 1 was immersed in methylene chloride for 60 seconds at ambient temperature. The excess solvent was removed by squeezing, and the laminate was dried at 140°C for 3 minutes.

The modified laminate exhibited a slightly crinkled urethane facing layer.

EXAMPLE 4

A laminate having a woven cotton backing layer and a urethane facing layer of the diisocyanate/polyethylene glycol type was treated in accordance with the procedure in Example 3. After drying, the laminate exhibited a slightly crinkled urethane facing layer.

EXAMPLE 5

A laminate having a woven cotton backing layer and an acrylic facing layer, said facing layer being a polymer obtained by the polymerization of acrylonitrile, acrylic acid and an acrylic ester, was immersed in a solution of 75 percent acrylic acid and 25 percent water. The excess liquid was squeezed out by padding and the laminate was dried at 120°C for 5 minutes.

The resulting laminate possessed a crinkled and puckered acrylic facing layer which resembled rhinoceros hide.

EXAMPLE 6

A urethane/cotton laminate of the type described in Example 4 was immersed in liquid ammonia for 5 seconds. The laminate was then air-dried. The resulting laminate possessed a puckered urethane surface, the puckers being arranged in a scale-like pattern similar to an alligator skin.

EXAMPLE 7

The nylon backing layer of a laminate composed of a polyvinyl chloride facing layer and a non-woven nylon backing layer was sprayed by means of a spray gun with a solution of 50 percent formic acid and 50 percent water. The laminate was then dried at 100°C for 4 minutes.

The dried laminate possessed a rippled facing layer.

EXAMPLE 8

The urethane facing layer of a urethane/cotton laminate as described in Example 4 was exposed to the hot vapors of acrylic acid for 60 seconds by suspending the laminate in a chamber over a pool of the acid which was heated to 140°C. Thereafter, the laminate was air-dried.

The resulting laminate exhibited a finely crinkled urethane facing layer.

EXAMPLE 9

A laminate comprising a urethane facing layer of the diisocyanate/polyethylene glycol type and a rayon backing layer was immersed in water at ambient temperature for 10 seconds. The excess water was removed by padding and the laminate was then dried at 120°C for 8 minutes.

The resulting laminate exhibited a coarsely puckered urethane facing layer.

EXAMPLE 10

A laminate comprising a nylon backing layer and a urethane facing layer was printed on the backing layer side in a preselected design with a printing paste consisting of acrylic acid and fumed silica.

The laminate with the printing paste thereon was dried at 120°C for 5 minutes and thereafter washed in water until the printing paste was completely removed. Excess was then squeezed out by padding and the laminate was dried at 120°C.

The resulting laminate possessed a crinkled surface with extreme puckers in those areas directly opposite the area of the backing layer which had been printed with the paste.

EXAMPLE 11

The cotton backing layer of a urethane/cotton laminate was printed in a predetermined design pattern with a printing paste consisting of a mixture of 3 percent carboxymethylated starch in a solution of 40 percent sodium hydroxide. The printed laminate was dried at 100°C for 10 minutes, washed in water, rinsed in 5 percent acetic acid solution, rinsed again in water and dried at 100°C after removing the excess water by squeezing.

Pronounced puckers were produced in the facing layer in those areas directly opposite the areas of the backing layer to which the printing paste was applied.

EXAMPLE 12

A solution consisting of 60 parts formic acid and 40 parts methylene chloride was dripped in a pattern-like arrangement onto the urethane facing layer of a urethane/cotton laminate as described in Example 4. The laminate was then heated at 140°C for 4 minutes.

The resulting laminate possessed a crinkled facing layer in those areas contacted by the formic acid/methylene chloride solution.

Variations can, of course, be made without departing from the spirit and scope of the invention.

Having thus described our invention what we desire to secure and claim by Letters Patent is:

1. A method for producing a leather-like texturized laminate comprising securing a facing layer of a flexible continuous film composed of a material selected from the group consisting of urethanes, vinyl, acrylic, polyamides, polyesters, polyethylene, polypropylene, and silicone, to a backing layer of a textile fabric having upstanding napped or looped fibers secured to one side thereof, the facing layer being secured to the napped or looped fibers of the backing layer such that the backing and facing layers are spaced apart from but movable within a plane with respect to each other and then shrinking the backing layer such that the ratio of the unit area of the facing layer to the unit area of the backing layer is greater than the same ratio prior to the securement of the layers te one another and to produce in the surface of the facing layer, high and low portions which appear as ripples, puckers, and wrinkles on the facing layer.

2. A method for producing a leather-like texturized laminate comprising securing a facing layer of a flexible continuous film composed of a material selected from the group consisting of urethanes, vinyl, acrylic, polyamides, polyesters, polyethylene, polypropylene, and silicone, to a backing layer of a textile fabric having upstanding napped or looped fibers secured to one side thereof, the facing layer being secured to the napped or looped fibers of the backing layer such that the backing and facing layers are spaced apart from but movable within a plane with respect to each other and then expanding the facing layer such that the ratio of the unit area of the facing layer to the unit area of the backing layer is greater than the same ratio prior to the securement of the layers to one another and to produce in the surface of the facing layer, high and low portions which appear as ripples, puckers, and wrinkles, on the facing layers.

3. The process of claim 1 wherein localized areas of the backing layer are shrunken, said areas forming a preselected design pattern.

4. The process of claim 1 wherein the shrinkage is effected by applying a chemical shrinkage agent to the backing layer.

5. The process of claim 4 wherein the chemical shrinkage agent is applied to localized areas of the backing layer in a preselected design pattern.

6. The process of claim 1 which further comprises sanding the raised portions of the facing layer to produce a multiplicity of minute perforations therein.

7. The process of claim 2 wherein the expansion is carried out by applying a chemical expansion agent to the facing layer.

8. The process of claim 7 wherein the chemical expansion agent is applied to the facing layer in a predetermined design pattern.

9. The process of claim 2 which further comprises sanding the raised portions of the facing layer to produce a multiplicity of minute perforations therein.

* * * * *